(12) United States Patent
Kasaaian

(10) Patent No.: US 10,995,413 B2
(45) Date of Patent: May 4, 2021

(54) SULFIDE RECYCLING IN MANGANESE PRODUCTION

(71) Applicant: Arash M. Kasaaian, Landenberg, PA (US)

(72) Inventor: Arash M. Kasaaian, Landenberg, PA (US)

(*) Notice: Subject to any disclaimer, the term of this patent is extended or adjusted under 35 U.S.C. 154(b) by 161 days.

(21) Appl. No.: 16/121,583

(22) Filed: Sep. 4, 2018

(65) Prior Publication Data

US 2019/0003065 A1 Jan. 3, 2019

Related U.S. Application Data

(63) Continuation-in-part of application No. PCT/US2017/020390, filed on Mar. 2, 2017.

(60) Provisional application No. 62/302,648, filed on Mar. 2, 2016.

(51) Int. Cl.
| | | |
|---|---|---|
| *C25B 15/08* | (2006.01) | |
| *C25B 1/21* | (2006.01) | |
| *C25C 7/06* | (2006.01) | |
| *C25C 3/30* | (2006.01) | |
| *C22B 3/08* | (2006.01) | |

(Continued)

(52) U.S. Cl.
CPC ............. *C25B 15/08* (2013.01); *C22B 3/08* (2013.01); *C22B 3/44* (2013.01); *C25B 1/21* (2013.01); *C25C 1/10* (2013.01); *C25C 3/30* (2013.01); *C25C 7/06* (2013.01)

(58) Field of Classification Search
CPC .. C25B 15/08; C25B 1/21; C25C 7/06; C25C 3/30; C25C 1/10; C22B 3/08; C22B 3/44
See application file for complete search history.

(56) References Cited

U.S. PATENT DOCUMENTS

| | | |
|---|---|---|
| 2,325,723 A | 8/1943 | Wanamaker et al. |
| 2,339,911 A | 1/1944 | Chamberlain |
| 2,392,385 A | 1/1946 | Hunter |
| 2,445,826 A | 7/1948 | Hammerquist |
| 2,495,456 A | 1/1950 | Jacobs |
| 2,559,874 A | 7/1951 | Hammerquist |

(Continued)

FOREIGN PATENT DOCUMENTS

| | | |
|---|---|---|
| WO | 99/14403 A1 | 3/1999 |
| WO | 2011/085438 A1 | 7/2011 |

OTHER PUBLICATIONS

Aynsley, E. E. et al., The Laboratory Preparation of Hydrogen Sulfide: A Historical Survey, vol. 35, No. 7, pp. 347-349 (Jul. 1958).

(Continued)

*Primary Examiner* — Arun S Phasge
(74) *Attorney, Agent, or Firm* — Porter Wright Morris & Arthur LLP

(57) ABSTRACT

A method of producing manganese metal or EMD by leaching a source of manganese with a solution comprising sulfuric acid to form a leach solution, adding one or more sulfides generated in a sulfide recycle stage to the leach solution in order to form sulfide precipitates comprising heavy metal sulfides, removing the sulfide precipitates from the leach solution, feeding the leach solution to one or more electrolytic cells, subjecting the purified leach solution to electrolysis so as to deposit manganese metal or EMD, reacting the sulfide precipitates with an acid to generate $H_2S$, producing one or more sulfides from the $H_2S$ for recycle. Methods of producing manganese metal and a purified manganese sulfate solution are also provided.

20 Claims, 4 Drawing Sheets

(51) Int. Cl.
*C22B 3/44* (2006.01)
*C25C 1/10* (2006.01)

(56) References Cited

U.S. PATENT DOCUMENTS

| | | | |
|---|---|---|---|
| 2,810,685 A * | 10/1957 | Sakowski | C25C 1/10 |
| | | | 205/573 |
| 3,065,155 A | 11/1962 | Welsh | |
| 3,455,799 A | 7/1969 | Mantell et al. | |
| 4,489,043 A | 12/1984 | Bowerman et al. | |
| 4,707,227 A | 11/1987 | Higgins | |
| 5,534,234 A | 7/1996 | Reddin et al. | |
| 5,932,086 A * | 8/1999 | Kasaaian | C22B 47/00 |
| | | | 205/539 |
| 7,776,202 B2 | 8/2010 | Featherstone et al. | |
| 8,747,802 B2 | 6/2014 | Jiang et al. | |
| 2007/0114136 A1 | 5/2007 | Sanchez et al. | |
| 2012/0315214 A1 | 12/2012 | Jiang et al. | |
| 2013/0344332 A1 | 12/2013 | Wu | |

OTHER PUBLICATIONS

Chow, Norman et al., The Recovery of Manganese From Low Grade Resources: Bench Scale Metallugical Test Program Completed, Kemetco's Final Report of the Completed Bench Scale Test Program, Kemetco Research Inc., pp. 1-96 (Aug. 19, 2010).

Harris, M. et al., the production of electrolytic manganese in South Africa, Journal of the South African Institute of Mining and Metallurgy, pp. 137-142 (Feb. 1977).

Official Action from corresponding European Application No. 17715292.3, dated Feb. 7, 2020.

Response to Official Office Action from corresponding European Application No. 17715292.3, dated Aug. 14, 2020.

International Search Report and Written Opinion from corresponding International Application No. PCT/US2017/020390, dated Jun. 19, 2017.

Response to Written Opinion from corresponding European Application No. 17715292.3, dated Apr. 15, 2019.

* cited by examiner

SULFIDE RECYCLING IN MANGANESE PRODUCTION

CROSS REFERENCE TO RELATED APPLICATIONS

This application is a continuation-in-part of International Patent App. No. PCT/US2017/020390 filed on Mar. 2, 2017, entitled "Sulfide Recycling in Manganese Production." This application also claims priority to U.S. Provisional Patent Application No. 62/302,648, filed Mar. 2, 2016, entitled "Sulfide Recycling in Manganese Production." The entire disclosure of the foregoing applications are incorporated by reference herein.

BACKGROUND

High purity manganese and electrolytic manganese dioxide ("EMD") are typically produced by an electrolytic process (electrowinning, also known as electroextraction). For example, a manganese-containing material is leached with a sulfuric acid solution to provide a manganese sulfate ($MnSO_4$) solution. This leach solution is then subjected to electrolysis in an electrolytic cell, such that, depending on cell operating conditions, manganese is deposited on the cathode or EMD is deposited on the anode. Typically, spent electrolyte solution comprising sulfuric acid, manganese sulfate and ammonium sulfate (($NH_4)_2SO_4$) is withdrawn from the electrolytic cell, and provides most of the sulfuric acid solution for leaching. After the spent electrolyte solution is combined with the manganese ore (or other manganese source), the resulting leach solution containing manganese sulfate (as well as other sulfates, particularly $(NH_4)_2SO_4$)) is purified and thereafter returned to the electrolytic cell as the cell feed.

In the electrolytic production of high purity manganese, the spent electrolyte solution used for leaching comprises anolyte withdrawn from the electrolytic cell, and the cell feed (i.e., the purified leach solution) is introduced into the cathode side of the cell (i.e., as the catholyte). Pure manganese is deposited on the cathode(s) within the cathode chamber(s). For the electrolytic production of EMD ($MnO_2$), spent electrolyte solution withdrawn from the cell (which is typically an undivided cell) is similarly used for leaching purposes, and the purified leach solution is used as the cell feed. Pure EMD is deposited on the anode(s) within the electrolytic cell.

The manganese-containing material is typically roasted prior to leaching in order to reduce higher oxides of manganese (e.g., $MnO_2$, $Mn_2O_3$ and $Mn_3O_4$) to manganese oxide (MnO). Alternatively, and as described in U.S. Pat. No. 5,932,086, issued Aug. 3, 1999, titled "Process for Making Manganese," and International (PCT) Pub. No. WO 99/14403, published Mar. 25, 1999, titled "Process for Making Manganese" (both of which are incorporated by reference herein), the manganese ore can be sintered in order to convert $MnO_2$ to $Mn_3O_4$, and thereafter the $Mn_3O_4$ leached with a sulfuric acid solution along with a reducing agent (e.g., sulfur dioxide, activated carbon, hydrogen peroxide, hydrogen sulfide, reducing sugars and/or molasses) to provide a manganese sulfate solution (i.e., the cell feed).

Purification of the leach solution is generally necessary prior to feeding the leach solution into the electrolytic cell (as the cell feed). In particular, the leach solution should have very low concentrations of Fe, Al, Si, Ni, Co, Cu, Zn, Pb, Mo, etc. These impurities are deleterious to electrolysis operation, causing low current efficiency, and can also reduce the purity level of the manganese or EMD product. Typically, iron, aluminum and silica are removed from the leach solution by increasing the pH of the leach solution from about 3 (or lower) to about 4 to 7 (e.g., 6 to 7) and adding an oxidizing agent. The pH is increased by adding a base such as ammonia gas and/or lime to the leach solution, and typical oxidizing agents used for this purpose include $MnO_2$ and/or air. Iron, aluminum and silica (when present) will precipitate from the leach solution and can be removed by filtration or other conventional means.

Sulfides are used to remove heavy metals such as Ni, Co, Cu, Zn, Pb, and Mo as insoluble metal sulfides. In particular, after removal of Fe, Al and silica (and, in some instances, other impurities), one or more sulfides are added to the leach solution. Typically, the sulfides used for this purification step comprise one or more alkali metal or alkaline earth metal sulfides (e.g., NaHS and/or BaS) and/or ammonium sulfide, with about 5 to 10 times the stoichiometric amount of sulfide being necessary in order to reduce the heavy metal impurity level to below 1 mg/L (i.e., 1 ppm) in the leach solution/cell feed. Following the addition of the sulfide solution, the metal sulfide precipitates are removed from the leach solution, usually by filtration. However, not only are undesirable impurities such as Ni, Co, Cu and the like removed (as their insoluble sulfides), but also significant amounts of manganese (as MnS). In fact, these mixed sulfide solids (e.g., removed as a filter cake) can contain up to 90% MnS. In addition, the mixed sulfide solids are considered a hazardous waste material, and therefore must be disposed of in a controlled manner. As used herein, the terms "mixed sulfide solids" (or "mixed metal sulfide solids") and "mixed metal sulfate" refer to mixtures of two or more metal sulfides (e.g., MnS, NiS, CoS) and mixtures of two or more metal sulfates (e.g., $MnSO_4$, $NiSO_4$, $CoSO_4$, etc.), respectively.

Thus, the above-described electrolytic production of high purity manganese or EMD results in waste streams, particularly insoluble heavy metal sulfides of valuable metals such as Mn, Ni, Co, Cu and Mo, as well as sulfur (in the form of sulfides). In addition, many conventional processes for the electrolytic production of high purity manganese and/or EMD employ materials that can be difficult (or impossible) to obtain in sufficient quantities (or even in any quantity) at locations where manganese ore is typically processed. For example, ammonia, hydrogen sulfide and/or sodium sulfide are not always obtainable where manganese ore is processed, and in some instances, liquid and gaseous reactants are not permitted to be brought on site.

While a variety of devices and techniques may exist for producing manganese and EMD, it is believed that no one prior to the inventor(s) has made or used an invention as described herein.

BRIEF DESCRIPTION OF THE DRAWINGS

While the specification concludes with claims particularly pointing out and distinctly claiming the invention, it is believed that the invention will be better understood from the detailed description of certain embodiments thereof when read in conjunction with the accompanying drawings. Unless the context indicates otherwise, like numerals are used in the drawings to identify similar elements in the drawings. In addition, some of the figures may have been simplified by the omission of certain elements in order to more clearly show other elements. Such omissions are not necessarily indicative of the presence or absence of particular elements in any of the exemplary embodiments, except as may be explicitly stated in the corresponding detailed description.

Figure 1:
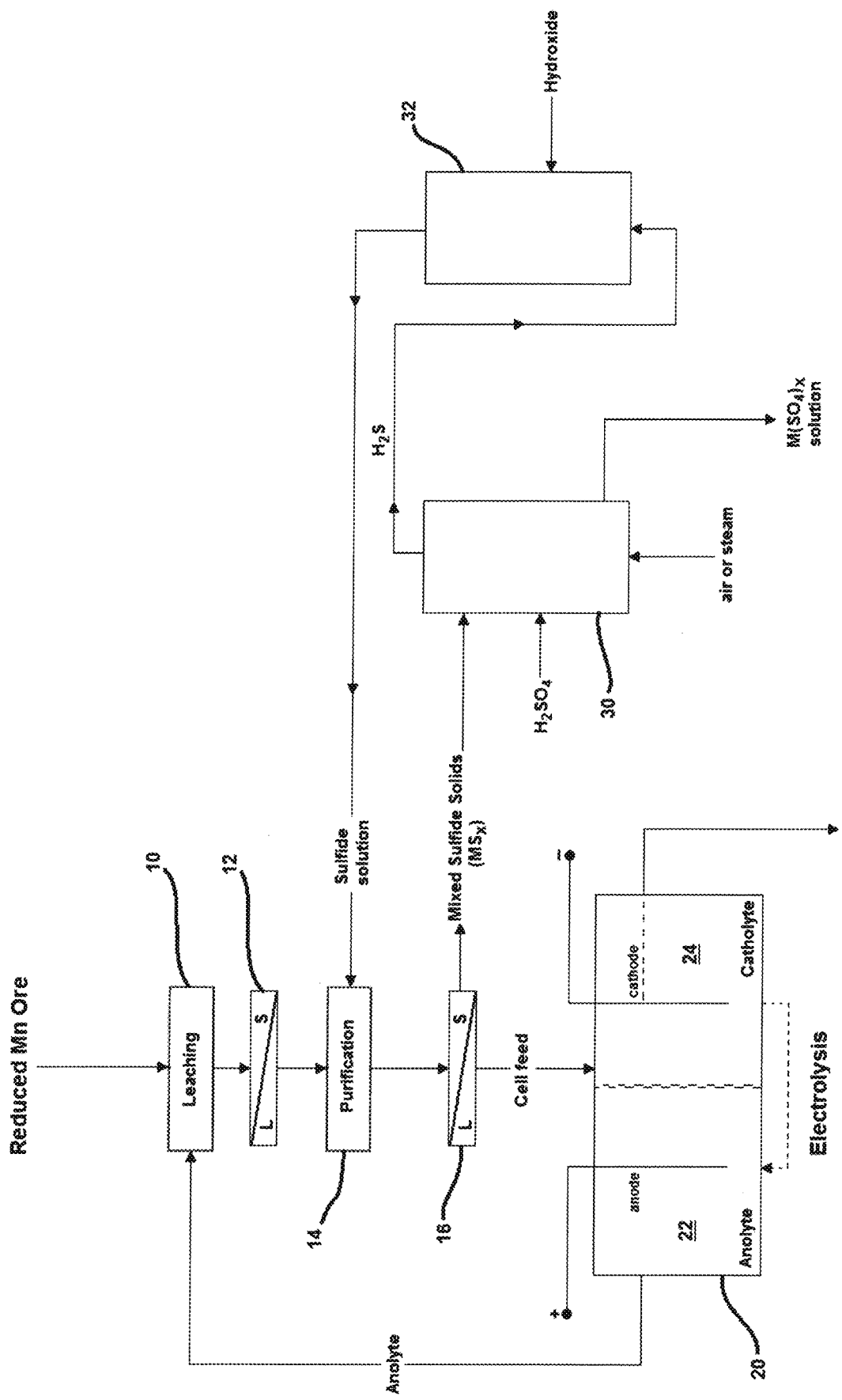
FIG. 1 depicts a schematic illustration of one embodiment of a manganese production process.

The drawings are intended to illustrate rather than limit the scope of the present invention. Embodiments of the present invention may be carried out in ways not necessarily depicted in the drawings. Thus, the drawings are intended to merely aid in the explanation of the invention. Thus, the present invention is not limited to the precise arrangements shown in the drawings.

DETAILED DESCRIPTION

The following detailed description describes examples of embodiments of the invention solely for the purpose of enabling one of ordinary skill in the relevant art to make and use the invention. As such, the detailed description and illustration of these embodiments are purely illustrative in nature and are in no way intended to limit the scope of the invention, or its protection, in any manner. It should also be understood that the drawings are not to scale and in certain instances details have been omitted, which are not necessary for an understanding of the present invention.

Embodiments of the present disclosure provide a method of recovering and recycling sulfide from a heavy metal sulfide waste, wherein the sulfide is recovered as MnS that is then recycled back to a production process. A waste stream comprising a slurry of heavy metal sulfides is reacted with an acid in order to generate $H_2S$. The $H_2S$ is then reacted with an $Mn^{2+}$ solution to produce MnS that is recovered (e.g., by filtration) and then recycled back to a production process (e.g., a process for producing manganese or EMD). By way of example, following $H_2S$ generation, the $H_2S$ is removed and absorbed in a solution containing $Mn^{2+}$. In some instances, the heavy metal sulfide waste stream is produced during the step of purifying a manganese-containing solution during the electrolytic production of manganese or EMD, and the recovered MnS is recycled back for use in this same purification step. The manganese-containing solution being purified contains manganese (e.g., $MnSO_4$) as well as a plurality of other heavy metals. The acid reacted with the slurry of heavy metal sulfides comprises, for example, sulfuric acid.

By way of one specific example, the heavy metal sulfide waste stream is produced during the pre-electrolysis purification of a leach solution in a process for the production of manganese metal or EMD, and the $Mn^{2+}$ solution reacted with the generated H2S comprises electrolytic cell feed or electrolyte solution (e.g., catholyte) extracted from the electrolytic cell. By using cell feed or electrolyte solution extracted from the electrolytic cell, high purity MnS (>90%, >95%, >99%, >99.5%, >99.9%, >99.95%, >99.99%, or even >99.995% purity) can be produced and recycled back for use in purifying a manganese-containing solution. Applicant has discovered that the use of high purity recycled MnS for the pre-electrolysis purification of the leach solution (rather than adding conventionally used sulfides such as ammonium sulfide, alkali metal sulfide or alkaline earth metal sulfide) in order to provide the cell feed significantly reduces the amount of Mn in the heavy metal sulfide waste stream. In addition, this avoids the need to purchase other sulfides for purification (or significantly reduces the amount needed), and reduces the total amount of solid waste that is produced.

Other embodiments of the present disclosure provide a method of recovering and recycling sulfide from a heavy metal sulfide waste stream, wherein the sulfide is recovered as one or more alkali metal sulfides, alkaline earth metal sulfides and/or ammonium sulfide (as $(NH_4)HS$ and/or $(NH_4)_2S$) that are recycled back to a production process. A waste stream comprising a slurry of heavy metal sulfides is reacted with an acid in order to generate $H_2S$. The $H_2S$ is then reacted with a solution, suspension or slurry containing one or more alkali, alkaline earth, or ammonium hydroxides and/or ammonia gas in order to produce the corresponding sulfide(s). These sulfides are then recycled back to a production process (e.g., a process for producing manganese or EMD). Alternatively, a two-step sulfide recycle stage is employed wherein the $H_2S$ is reacted with a solution, suspension or slurry containing one or more alkali or alkaline earth hydroxides to form the corresponding sulfide(s), and that sulfide(s) is then converted into another sulfide(s) (e.g., an ammonium sulfide) prior to being recycled back to the production process.

By way of example, following $H_2S$ generation, the $H_2S$ is removed and absorbed in a solution, suspension or slurry containing one or more alkali, alkaline earth, or ammonium hydroxides. In some instances, the heavy metal sulfide waste stream is produced during the step of purifying a manganese-containing solution (e.g., pre-electrolysis purification of a leach solution) during the production of manganese or EMD, and the recovered sulfide is recycled back for use in this same purification step. The acid reacted with the slurry of heavy metal sulfides comprises, for example, sulfuric acid, and reaction of the slurry of heavy metal sulfides with $H_2SO_4$ generates not only $H_2S$ but also a metal sulfate solution. In some embodiments, the hydroxide(s) in the absorption solution, suspension or slurry comprise one or more of LiOH, NaOH, and KOH. In other embodiments, the hydroxide(s) in the absorption solution, suspension or slurry comprise one or more of $Mg(OH)_2$, $Ca(OH)_2$, and $Ba(OH)_2$. In still further embodiments, the hydroxide(s) in the absorption solution, suspension or slurry comprise one or more alkali or alkaline earth hydroxides (e.g., $Mg(OH)_2$, $Ca(OH)_2$, and/or $Ba(OH)_2$) such that the corresponding sulfide(s) is formed, which, in a second step, is reacted with ammonium sulfate ($(NH_4)_2SO_4$) to form an ammonium sulfide ($(NH_4)HS$ and/or $(NH_4)_2S$) solution that is recycled back to the purification step. Alternatively, the $H_2S$ is absorbed into a solution containing ammonia or ammonium ion to form an ammonium sulfide solution. By way of one specific example, the heavy metal sulfide waste stream is produced during the pre-electrolysis purification of a leach solution in a process for the production of manganese metal or EMD.

In the above-described embodiments for the production of manganese metal or EMD, when sulfuric acid is reacted with the slurry of heavy metal sulfides to generate the $H_2S$, a mixed metal sulfate solution is also generated. In some embodiments sulfide is added to the mixed metal sulfate solution in order to convert at least a portion of the metal sulfates into their corresponding metal sulfides.

Embodiments described herein also include methods for electrolytically producing manganese metal or EMD wherein sulfide removed from the leach solution prior to electrolysis (i.e., as mixed metal sulfides) is recovered and recycled back to the pre-electrolysis purification step rather than being discarded (e.g., as mixed sulfide solids filter cake). In addition, heavy metals such as Ni, Co, Cu, Zn, Pb, Mo, Sb, As and Bi (hereinafter, "Secondary Metals") can be recovered. It will be understood that not all of these Secondary Metals are necessarily present in the process, depending, in part, on the Mn-containing starting material.

The mixed metal sulfide solids removed from the leach solution in the pre-electrolysis purification step are reacted with an acid (e.g., $H_2SO_4$) to generate $H_2S$ on site. When the acid used is $H_2SO_4$, the metals of the mixed sulfide solids (i.e., Mn and one or more of the Secondary Metals) form mixed metal sulfates that remain in solution, and the metals can be recovered therefrom in one or more subsequent steps (as further described herein). The $H_2S$, generated by reacting the mixed metal sulfides with acid is the vehicle used to recycle sulfide back to the pre-electrolysis purification step.

In particular, the generated $H_2S$ is reacted in order to generate sulfide(s) that is recycled back to the pre-electrolysis purification step. In some embodiments, the generated $H_2S$ is reacted with a solution containing $Mn^{2+}$ ions (e.g., a solution containing $MnSO_4$) in order to generate MnS that is then recycled back to the pre-electrolysis purification step. In one particular embodiment, the $Mn^{2+}$ containing solution reacted with the $H_2S$ comprises electrolysis cell feed and/or catholyte extracted from the electrolysis cell. Since cell feed and catholyte have been purified to remove Secondary Metals, relatively pure MnS can be generated in this manner. For example, the MnS recycled back to the pre-electrolysis purification step is generally pink/orange in color, indicating that minimal amounts of Secondary Metal sulfides are present. Thus, the recycled sulfide in these embodiments is primarily MnS, with less than 10%, less than 5%, less than 1%, less than 0.5%, less than 0.1%, less than 0.05%, less than 0.01%, or even less than 0.005% by weight Secondary Metal sulfides (based on the total sulfide solids present in the recycle stream).

In still further embodiments for electrolytically producing manganese metal or EMD wherein sulfide removed from the leach solution prior to electrolysis, the generated $H_2S$ is reacted with one or more alkali, alkaline earth or ammonium hydroxides and/or ammonia gas in order to generate the corresponding alkali metal sulfide(s), alkaline earth metal sulfide(s) and/or ammonium sulfide. The sulfide(s) is then recycled back to the pre-electrolysis purification step.

Yet another embodiment of the present disclosure provides a method of purifying an $MnSO_4$ solution containing one or more heavy metal impurities chosen from the group consisting of Ni, Co, Cu, Zn, Pb, Mo, Sb, As and Bi. This method comprises reacting the $MnSO_4$ solution with MnS, without adding any additional sulfides, such that the heavy metal impurities form their respective sulfide precipitates (NiS, CoS, etc.). Applicant has discovered that by reacting the $MnSO_4$ solution with high purity MnS (>90%, >95%, >99%, >99.5%, >99.9%, >99.95%, >99.99%, or even >99.995% purity), the heavy metal impurities are precipitated as their respective sulfides while the Mn remains in solution (as soluble $MnSO_4$). The MnS used to extract the heavy metal impurities comprises high purity MnS containing less than 10%, less than 5%, less than 1%, less than 0.5%, less than 0.1%, less than 0.05%, less than 0.01%, or less than 0.005% by weight of other metal sulfides (based on total sulfide solids).

Figure 2:
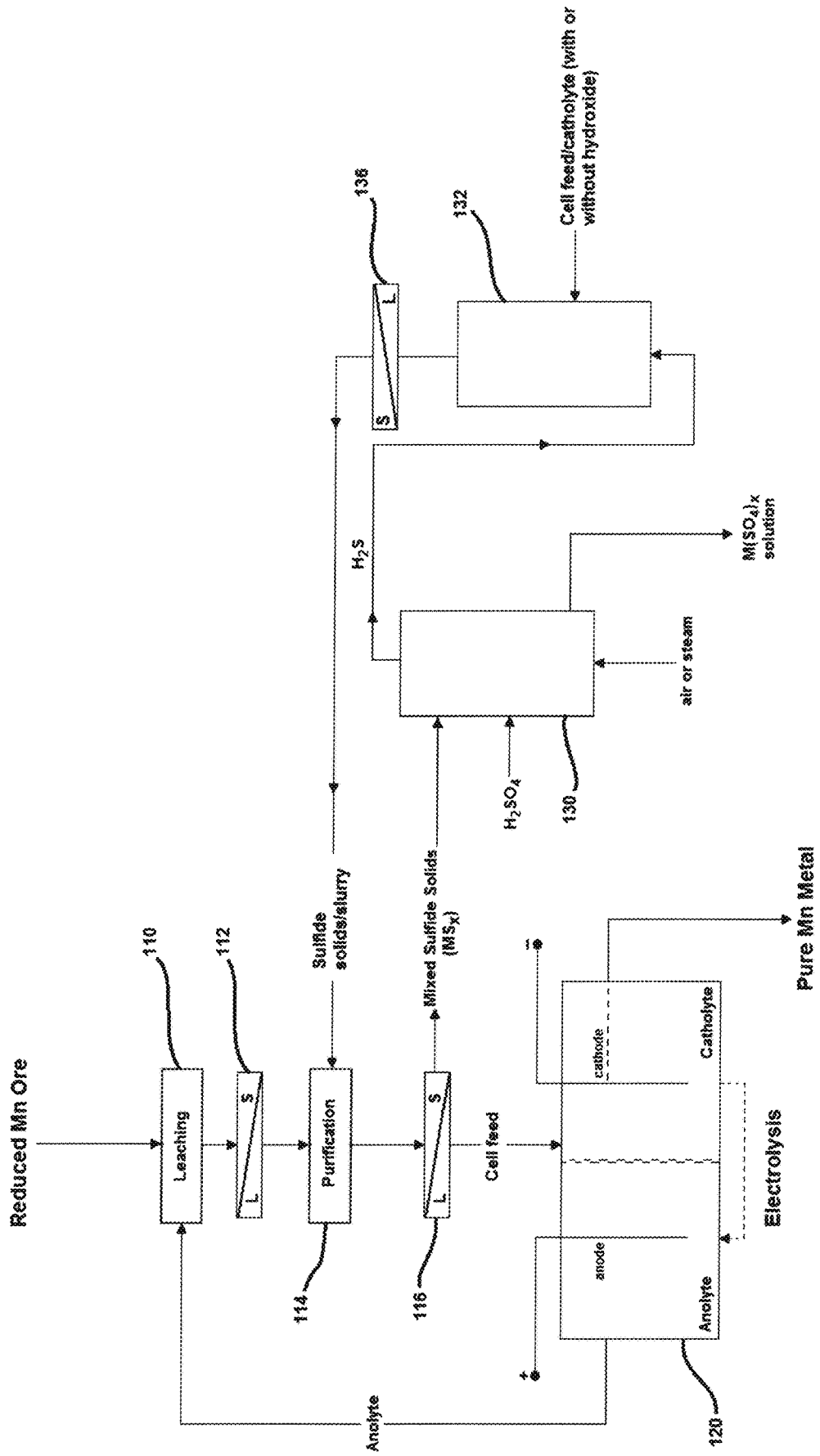
FIG. 2 depicts a schematic illustration of another embodiment of a manganese production process.

FIGS. 1 and 2 and their discussion below describe the production of manganese metal (or, alternatively, EMD) using a source of manganese. By way of example, as is well-known to those skilled in the art, naturally-occurring manganese-containing material is reduction roasted prior to leaching in order to reduce higher oxides of manganese (e.g., $MnO_2$, $Mn_2O_3$ and $Mn_3O_4$) to manganese oxide (MnO) (i.e., reduced Mn ore). It will be understood, however, that other sources of manganese may be employed as feedstock, including sources of MnO that do not require reduction, as well as $Mn_3O_4$-containing and/or manganese carbonate-containing materials. For example, the processes described in U.S. Pat. No. 5,932,086 and PCT Pub. No. WO 99/14403—sintering manganese ore in order to convert $MnO_2$ to $Mn_3O_4$, then adding a reducing agent (e.g., sulfur dioxide, activated carbon, hydrogen peroxide, hydrogen sulfide, reducing sugars and/or molasses) to the leach solution—can be used to provide the manganese-containing material used in the processes described herein.

For producing manganese, an $MnSO_4$ leach solution, following purification to remove certain impurities, is added to the cathode side of an electrolysis cell(s). One or more electrolytic cells are employed, each having an anolyte chamber and a catholyte chamber, typically separated by a membrane or diaphragm. While operating conditions can vary, cell temperature is typically around 30 to 40° C. and the pH on the cathode side of the cell is typically about 7 to 9. Ammonium sulfate (($NH_4)_2SO_4$) is also typically present in the cell, and acts as a buffer on the cathode side for maintaining the proper pH. The membrane/diaphragm ensures that the catholyte pH is significantly higher than the acidic pH of the anolyte, since acid ($H_2SO_4$) (along with water) is generated at the anode. When an electrical potential is applied between the cathode(s) and anode(s), pure manganese metal is deposited onto the cathode(s), from which it can be recovered by conventional means known to those skilled in the art.

For producing EMD, a divided cell is not necessary since EMD is produced under acidic conditions. While operating conditions can once again vary, cell temperature for the production of EMD is typically around 90 to 100° C. and the pH throughout the cell is highly acidic (e.g., less than 2). Ammonium sulfate is also not needed under these operating conditions. When an electrical potential is applied between the cathode(s) and anode(s), EMD is deposited onto the anode(s), from which it can be recovered by conventional means known to those skilled in the art. Acid is also generated at the anode.

FIG. 1 is a schematic representation of one embodiment of a process for producing manganese according to the present disclosure, wherein mixed metal sulfide solids (MnS+Secondary Metal sulfides) removed from the leach solution (e.g., by filtration) in a pre-electrolysis purification step (14) are reacted with $H_2SO_4$ to generate $H_2S$. The $H_2S$ is then reacted with one or more alkali hydroxides, alkaline earth hydroxides or ammonium hydroxide and/or ammonia gas to generate the corresponding alkali metal sulfide(s), alkaline earth metal sulfide(s) and/or ammonium sulfide that is returned (i.e., recycled) to the pre-electrolysis purification step.

Figure 4:
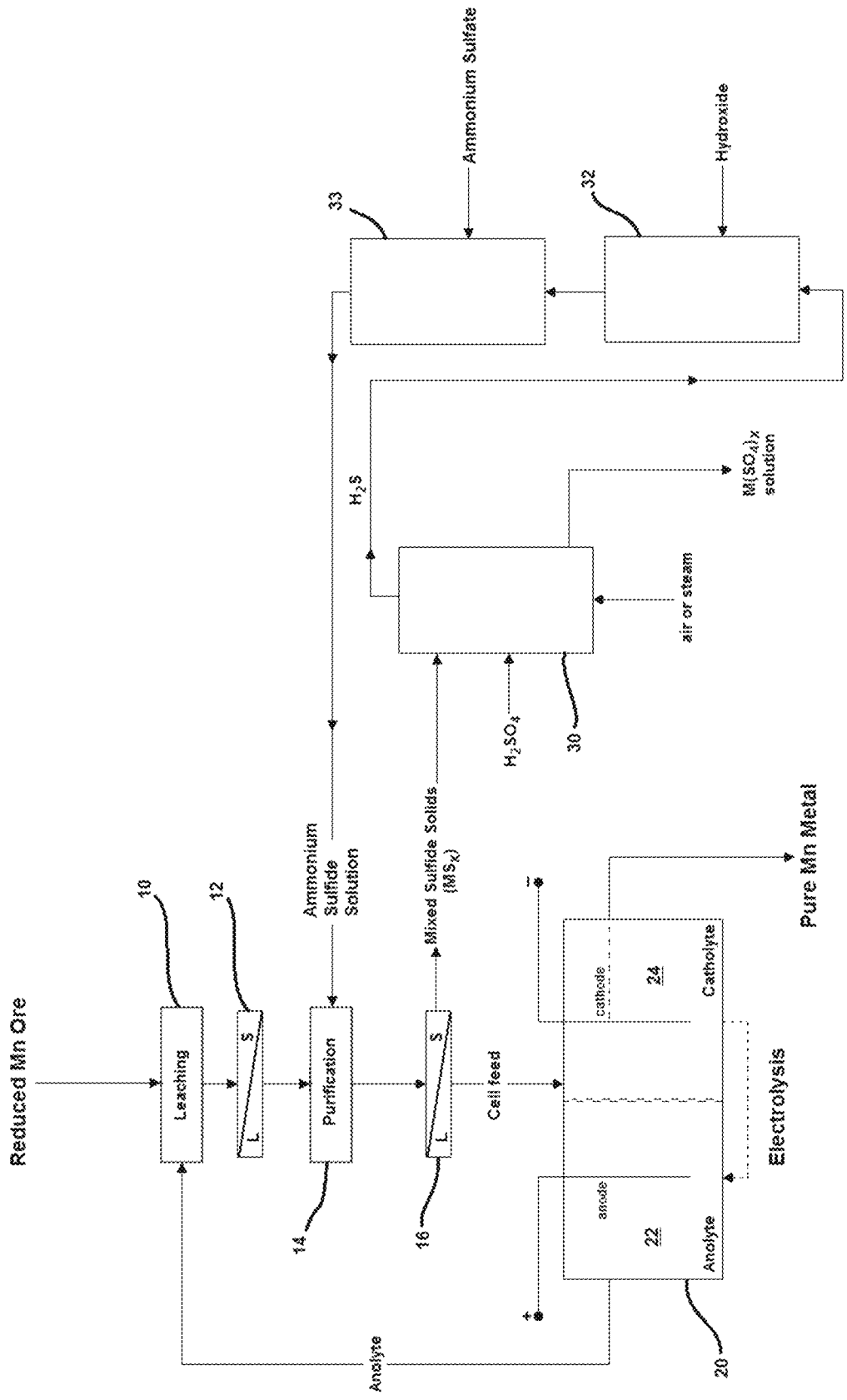
FIG. 4 depicts a schematic illustration of an alternative embodiment similar to FIG. 1, wherein a two step sulfide recycle stage is employed.

Alternatively, as depicted in FIG. 4, the $H_2S$ is reacted with one or more alkali hydroxides or alkaline earth hydroxides (e.g., $Ca(OH)_2$) to form a corresponding first sulfide(s) (e.g., CaS), and that first sulfide is then reacted to form another sulfide(s) (e.g., ammonium sulfide) that is returned (i.e., recycled) to the pre-electrolysis purification step. By way of example, the $H_2S$ is reacted with $Ca(OH)_2$ to form CaS, which is then reacted (e.g., in a separate reactor) with an ammonium sulfate (($NH_4)_2SO_4$) solution to form an ammonium sulfide (($NH_4)HS$ and/or $(NH_4)_2S$) solution that is recycled back to the pre-electrolysis purification step. The nature of the ammonium sulfide formed (($NH_4$)HS and/or ($NH_4$)$_2$S) will depend, in part, on the acidity of the reaction solution when the first sulfide is reacted with ammonium sulfate to form ammonium sulfide.

It will be understood that various conventional processing steps are not depicted in FIG. 1. In addition, the process of FIG. 1 can be modified in order to produced EMD rather than manganese, as described above.

In leaching step (10), a source of manganese such as reduced manganese ore, primarily comprising MnO, is leached with a sulfuric acid solution in order to convert the MnO (or other manganese source) to manganese (II) sulfate ($MnSO_4$). The sulfuric acid solution used for leaching comprises spent electrolyte solution, i.e., anolyte, withdrawn from the electrolysis cell(s). In addition to $H_2SO_4$, the spent electrolyte solution also contains $MnSO_4$, and $(NH4)_2SO_4$. (In the production of EMD, ammonium sulfate is not present in the electrolyte solution withdrawn from the cell(s) for leaching.) The Mn ore and sulfuric acid solution are combined in a suitable vessel, such as an open stirred tank. Of course, other types of conventional equipment can be employed for this purpose. Additional sulfuric acid and $(NH4)_2SO_4$ are periodically added to the process, as needed, typically by an addition to the leach tank.

The reduced Mn ore (or other feedstock) not only contains MnO (or other manganese source), but also one or more impurities such as Fe, Al, Si, as well as some or all of the Secondary Metals (Ni, Co, Cu, Zn, Pb, Mo, Sb, As and Bi). These impurities are removed prior to electrolysis. First, iron, aluminum and silica are removed from the leach solution by increasing the pH of the leach solution and adding an oxidizing agent. For example, $NH_3$, lime and/or MnO is added to the leach solution in order to increase the pH (from about 3 or less) to about 4 to 9, about 4 to 7, or about 6 to 7. Suitable oxidizing agents include, for example, $MnO_2$, oxygen (typically as air), $O_3$ or $H_2O_2$. $MnO_2$ and/or air are typically used for this purpose for cost savings. When used, air is bubbled into a vessel containing the leach solution. Following the pH adjustment and the addition of $MnO_2$ and/or air as oxidizing agents, iron, aluminum and silica will precipitate from the leach solution and are removed by filtration in step (12) (or by other conventional means for removing solids).

Following removal of Fe, Al and Si in step 12, the leach solution is subjected to pre-electrolysis purification step (14) in order to remove heavy metal impurities, i.e., the Secondary Metals. In this step, one or more sulfides are added to the leach solution, causing the heavy metals to be converted into their respective insoluble sulfides. In particular, an aqueous sulfide solution comprising one or more alkali metal, alkaline earth metal and/or ammonium sulfides is added to the leach solution, wherein the sulfides are obtained from the sulfide recovery loop described below. Suitable sulfides include, for example, $Li_2S$, $Na_2S$, NaHS, $K_2S$, KHS, MgS, CaS, BaS and/or $NH_4HS$, and their concentration in the sulfide solution used in step (14) preferably does not exceed their respective solubility limits (i.e., they are preferably in solution). The leach solution and sulfide solution are combined in a suitable vessel, such as an open stirred tank; however, other types of conventional equipment can be employed for this purpose.

Following the addition of the sulfide solution, the heavy metal impurities are converted from their sulfates into their respective insoluble sulfides (e.g., NiS, CoS, etc.). A portion of the $MnSO_4$ is also converted into insoluble MnS. The resulting sulfide precipitates are removed from the leach solution by filtration step (16) (or by other conventional means for removing solids), resulting in mixed sulfide solids ("$MS_x$") comprising sulfides of Mn, as well as sulfides of some or all of the Secondary Metals. (It will be understood that "$MS_x$" is intended to refer generally to the various sulfides of these metals, rather than a precise chemical formula.) In general, the mixed sulfide solids resulting from step (16) in FIG. 1 comprise about 50 to about 95% MnS by weight (on a dry basis), along with varying amounts of other heavy metal sulfides depending on, among other things, the impurities present in the Mn-containing feedstock.

Following removal of the mixed sulfide solids (e.g., as a slurry), the purified leach solution is the cell feed for electrolysis step (20). The level of impurities remaining in the cell feed will vary depending on the feedstock and the purification parameters (e.g., amount of sulfide solution added). For example, the level of heavy metals (Fe and the Secondary Metals) can be less than about 5 mg/L, or even less than about 1 mg/L. The cell feed is introduced into the cathode side of the electrolysis cell(s), thereby supplying $Mn^{2+}$ to the catholyte (the solution on the cathode side of the electrolysis cell(s)). In some embodiments the cell feed will generally comprise less than 1 mg/L of heavy metal impurities (Fe and the Secondary Metals) and at least about 30 g/L $Mn^{2+}$. One or more electrolytic cells are employed, each having an anolyte chamber (22) and a catholyte chamber (24), typically separated by a diaphragm or membrane such as a cloth membrane. When an electrical potential is applied between the cathode(s) and anode(s), pure manganese metal is deposited onto the cathode, from which it can be recovered by conventional means known to those skilled in the art.

The sulfide recovery loop in the embodiment of FIG. 1 comprises an $H_2S$ generation stage (30) and a sulfide recycle stage (32). In the $H_2S$ generation stage (30), the mixed sulfide solids ($MS_x$) slurry recovered from the leach solution is reacted with an acid, e.g., an aqueous solution of $H_2SO_4$. This reaction may be take place in any suitable vessel, such as an agitated tank. The mixed sulfide solids react with $H_2SO_4$ according to the reaction:

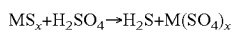

$$MS_x + H_2SO_4 \rightarrow H_2S + M(SO_4)_x$$

wherein M is Mn as well as some or all of the Secondary Metals (i.e., Ni, Co, Cu, etc.), depending on the composition of the Mn-containing feedstock. The generated $H_2S$ is then stripped from the reaction solution using, for example, a packed column and air or other gas suitable for stripping $H_2S$. Alternatively, the reaction vessel can be heated to boiling, with the steam carrying the $H_2S$ from the reaction vessel. Of course, a variety of apparatus can be employed for the $H_2S$ generation and removal, such as those commonly used for contacting a gas and a liquid. In addition, various other acids besides $H_2SO_4$ can be used, including HCl and $H_3PO_4$.

In addition to stripping $H_2S$ from the reaction solution, the air, steam or other gas used in the $H_2S$ generation stage (30) facilitates the transfer of $H_2S$ from generation stage (30) to the sulfide recycle stage (32). The solution remaining in the $H_2S$ generation stage (30) comprises a solution of mixed metal sulfates ($M(SO_4)_x$). As further described herein, the metals can be recovered therefrom in one or more subsequent steps.

In the sulfide recycle stage (32), the $H_2S$ from generation stage (30) is absorbed in (i.e., reacted with) a solution, suspension or slurry of one or more alkali metal, alkaline earth metal and/or ammonium hydroxides. In particular, the H2S is put through a column such as a tray column or packed column, or other device commonly used for contacting gas and liquid, along with an aqueous hydroxide solution such as a solution of NaOH. Alternatively, the $H_2S$ can be bubbled into an agitated tank containing an aqueous hydroxide solution/suspension/slurry. The $H_2S$ reacts with, for example, NaOH according to the reactions:

$$H_2S + 2NaOH \rightarrow Na_2S + 2H_2O$$

$$H_2S + 2NaOH \rightarrow NaHS + H_2O$$

Other hydroxides react with $H_2S$ in a similar manner to generate the corresponding sulfide(s). For example, $$Ba(OH)_2 + H_2S \rightarrow BaS + 2H_2O$$

As yet another alternative, the $H_2S$ can be reacted with ammonia gas in order to generate $NH_4HS$.

As a further alternative, and as depicted in FIG. 4, in a first step (32) of the sulfide recycle stage an alkali metal or alkaline earth metal hydroxide is reacted with H2S to generate the corresponding sulfide(s). For example, $$Ca(OH)_2 + H_2S \rightarrow CaS + 2H_2O.$$

In a second step (33) the resulting sulfide solution (e.g., CaS) is then converted into a different sulfide that is then recycled to the purification step. For example, when CaS is formed in a first step (32) of the sulfide recycle stage, in a second step (33) the CaS solution is reacted with an ammonium sulfate (($NH_4$)$_2SO_4$) solution to form ammonium sulfide (as ($NH_4$)HS and/or ($NH_4$)$_2S$) This second step can be performed in any suitable vessel, such as an agitated tank (e.g., a vessel separate from that used for generating the first sulfide from $H_2S$).

In either the embodiment of FIG. 1 or that of FIG. 2, the resulting sulfide solution (e.g., $Na_2S$/NaHS, BaS, ($NH_4$)HS and/or other sulfides) is then returned to purification step (14) described above in order to convert heavy metals in the leach solution into their respective insoluble sulfides (which are thereafter removed from the leach solution prior to electrolysis). In general, particularly since the processes described herein are typically performed on a batch basis, more and more hydroxide is added in order to generate a higher concentration sulfide solution, thereby reducing storage costs and maintaining a better water balance in the circuit. In addition, for the pre-electrolysis purification step (14), a stoichiometric excess (e.g., 5x to 10x) is typically used in order to ensure nearly complete precipitation of the Secondary Metals (as their respective sulfides).

It will be understood that any alkali metal, alkaline earth metal and/or ammonium hydroxide can be used in sulfide recycle stage (32), including one or more of LiOH, NaOH, KOH, Mg(OH)$_2$, Ca(OH)$_2$, Ba(OH)$_2$ and/or $NH_4OH$. The use of alkali metal and/or alkaline earth metal hydroxides is advantageous at sites where ammonia cannot be obtained or utilized, whether because of logistical reasons or prohibitions on its use. Similarly, in the embodiment wherein a first sulfide is converted into a second sulfide (e.g., ($NH_4$)HS) this conversion is advantageous in that it allows sulfide to be recycled as ammonium sulfide without requiring the use of ammonia gas (e.g., at sites where ammonia cannot be obtained or utilized). Instead, solid ammonium sulfate (($NH_4$)$_2SO_4$) can be used in the second step of forming ammonium sulfide(s) as the vehicle for recycling sulfide to the purification stage (14).

As a result of the above process, it is not necessary to continually add sulfide to the process, as the sulfide necessary for purification (i.e., the precipitation of the Secondary Metals) is recovered from the mixed metal sulfides and recycled back into the process. (Although it may be necessary to add additional sulfide from time to time in order to, for example, make up for lost sulfide.) In addition, the mixed metal sulfides ($MS_x$) are converted into their sulfates ($M(SO_4)_x$), and the resulting $M(SO_4)_x$ solution remaining after the $H_2S$ generation stage (30) can be readily processed to recover not only Mn (e.g., as $MnSO_4$, which can be returned to the leaching step (10)), but also the Secondary Metals.

By way of example, when the $MnSO_4$ concentration in the $M(SO_4)_x$ solution generated in stage (30) reaches high levels (e.g., about 20 to 300 g/L), the impurity level will typically be about 0.1 to 10 g/L. At this point, the $M(SO_4)_x$ solution can be neutralized with an alkaline or alkaline earth hydroxide or MnO, and separated from any solids such as $BaSO_4$ and/or $CaSO_4$. By way of further example, if Ba(OH)$_2$ is added in the sulfide recycle stage (32), the mixed sulfide solids reacted with acid in the $H_2S$ generation stage (30) will contain insoluble $BaSO_4$. Next, sulfide (e.g., a stoichiometric amount of sulfide such as MnS, $Na_2S$ or NaHS) is added to the neutralized $M(SO_4)_x$ solution, causing the Secondary Metals to precipitate as their respective sulfides. After filtering, the Secondary Metal sulfides can be, for example, sold for their metal value. The remaining liquid will mainly comprise an $MnSO_4$ solution, with small amounts of impurities, and can be returned to the leach solution where it will provide additional $Mn^{2+}$ for subsequent electrolysis or sold.

FIG. 2 is a schematic representation of an alternative embodiment of a process for producing manganese according to the present disclosure. As before, the process of FIG. 2 can be modified in order to produced EMD rather than manganese, as previously described herein.

In the process of FIG. 2, like that of FIG. 1, mixed metal sulfide solids removed from the leach solution following a pre-electrolysis purification step are reacted with an acid such as $H_2SO_4$ in order to generate $H_2S$. In this embodiment, however, the $H_2S$ is then reacted with a solution containing $Mn^{2+}$ ions in order to generate MnS that is recycled back to the pre-electrolysis purification step (e.g., in the form of a slurry). When the $Mn^{2+}$ solution reacted with the $H_2S$ contains low levels of Secondary Metals, high purity MnS is produced. In the example of FIG. 2, the $Mn^{2+}$ solution reacted with the $H_2S$ comprises a portion of the electrolysis cell feed and/or catholyte extracted from the electrolysis cell(s). (In the case of producing EMD using the process of FIG. 2, cell feed is reacted with the $H_2S$ in step (132).)

The applicant has found that, when high purity MnS is recycled back to the pre-electrolysis purification step, the MnS will react with the metal sulfates in the leach solution according to the following reaction:

$$MnS + M'SO_4 \rightarrow MnSO_4 + M'S_x$$

wherein M' is one or more of the Secondary Metals. In other words, the recycled MnS is used as the sulfide in the pre-electrolysis purification step.

Accordingly, in the leaching step (110) of the process depicted in FIG. 2, reduced manganese ore (or other suitable manganese-containing feedstock) is leached with a sulfuric acid solution in order to convert the MnO (or other manganese source) to manganese (II) sulfate ($MnSO_4$). As before, the sulfuric acid solution used for leaching comprises anolyte (spent electrolyte) withdrawn from the electrolysis cell(s). Additional sulfuric acid and ($NH_4$)$_2SO_4$) may be added, as needed. By way of example, the $Mn^{2+}$ concentration of the leach solution can be about 12 to 70 g/L, about 30 to 40 g/L, or about 32 g/L. These same $Mn^{2+}$ concentrations in the leach solution are also suitable for the process of FIG. 1. The $Mn^{2+}$ concentration of the cell feed is similar to that of the leach solution, as negligible amounts of $Mn^{2+}$ is lost to the mixed sulfide solids (as MnS) in step (116).

Iron, aluminum and silica, to the extent present in the feedstock, are removed from the leach solution in the manner described previously with respect to FIG. 1, i.e., in filtration step (112) (or by other conventional means for removing solids). The leach solution is then subjected to pre-electrolysis purification step (114) in order to remove heavy metal impurities (i.e., the Secondary Metals). In this step, sulfide solids or a sulfide slurry primarily comprising high purity MnS is added to the leach solution, causing the Secondary Metals to be converted into their respective insoluble sulfides. As before, a stoichiometric excess (e.g., about 5× to 10×) is used. The high purity MnS solids/slurry is obtained from the sulfide recovery loop described below.

Following the addition of the MnS solids/slurry, the Secondary Metal impurities are converted from sulfates into their respective insoluble sulfides (e.g., NiS, CoS, etc.). As in the previous embodiment, the resulting sulfide precipitates are removed from the leach solution by filtration step (116) (or by other conventional means for removing solids), resulting in mixed sulfide solids similar to those produced in the embodiment of FIG. 1.

As in the embodiment of FIG. 1, the purified leach solution following filtration step (116) is the cell feed for electrolysis step (120). Likewise, the sulfide recovery loop in the embodiment of FIG. 2, like that of FIG. 1, comprises an $H_2S$ generation stage (130) and a sulfide recycle stage (132). The $H_2S$ generation stage (130) is the same as that described previously for FIG. 1, with the generated $H_2S$ stripped from the reaction solution and supplied to the recycle stage (132). The $M(SO_4)_x$ solution generated in step (130) can be processed to recover Mn (e.g., as $MnSO_4$ for return to the leaching step (110)) and the Secondary Metals in the manner described previously.

In the sulfide recycle stage (132), the $H_2S$ from generation stage (130) is reacted with a solution containing $Mn^{2+}$ ions in order to generate high purity MnS that is recycled back to the pre-electrolysis purification step (114), such as in the form of solids or a slurry. While other $Mn^{2+}$ containing solutions can be used, the cell feed and/or catholyte provide a readily available $Mn^{2+}$ solution for this purpose, as each contains appreciable amounts of $MnSO_4$ in solution. Also, by using cell feed or catholyte to generate MnS for recycle back to the purification step (114), considerable cost savings can be achieved. For example, as compared to the process of FIG. 1, there is no need to purchase additional sulfide such as BaS for the pre-electrolysis purification step (114). While it is necessary to add acid, such as $H_2SO_4$ in the $H_2S$ generation step (130), $H_2SO_4$ is already used in the process and can be inexpensively manufactured on site.

The $H_2S$ is reacted with cell feed and/or catholyte solution such that the $H_2S$ reacts with $MnSO_4$ according to the reaction:

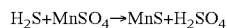

$$H_2S + MnSO_4 \rightarrow MnS + H_2SO_4$$

This reaction is carried out, for example, in the manner described above with respect to FIG. 1, such as using a tray column or packed column, or other device commonly used for contacting gas and liquid, or by bubbling the $H_2S$ into an agitated tank containing the $Mn^{2+}$ solution.

Assuming that sufficient $MnSO_4$ and $H_2S$ are available in sulfide recycle stage (132), the above reaction will proceed until the pH of the reaction solution reaches about 3 to 4—at which point $H_2S$ will no longer react with $Mn^{2+}$ to produce MnS. Thus, the pH of the reaction solution should be maintained above 4, or above about 4.5 in order to prevent excessive odor (from unreacted $H_2S$). Also, since the catholyte typically has a higher pH (about 8.5) than the cell feed (pH about 7), more MnS can be produced from catholyte before the lower pH limit is reached. In addition, base can be added to the reaction solution in recycle stage (132) in order to maintain the pH at about 6 to 7, while adding sufficient $H_2S$ to precipitate all of the Mn (as MnS) in the reaction solution. Suitable bases include, for example, alkali, alkaline earth or ammonium hydroxides and/or ammonia gas, or even MnO.

The reaction product from the recycle stage (132) is filtered (or otherwise removed) in step (136) and the recovered high purity MnS (as a solid or slurry) is returned to purification step (114) described above in order to convert the Secondary Metals in the leach solution into their respective insoluble sulfides (which are thereafter removed from the leach solution prior to electrolysis). The high purity MnS returned to purification step (114) contains less than 10%, less than 5%, less than 1%, less than 0.5%, less than 0.1%, less than 0.05%, less than 0.01%, or even less than 0.005% by weight of other metal sulfides (based on the total sulfide solids). The filtrate remaining after filtration step (136) can be used, for example, as additional cell feed, particularly when an excess of cell feed or catholyte is used in recycle stage (132) such that the filtrate contains unreacted $Mn^{2+}$.

Once again as a result of the process of FIG. 2, it is not necessary to continually add sulfide to the process, as the sulfide necessary for purification (i.e., precipitation of heavy metals) is recovered from the mixed metal sulfides and recycled back into the process. In addition, the pure MnS used for purification purposes is safer and easier to store than the sulfides used in conventional processes, does not introduce additional water into the system, has very little odor (especially compared to ammonium sulfide/bisulfide), and does not add unwanted elements such as Na to the cell feed. Furthermore, the cost of sulfides (e.g., NaHS, BaS, NH4HS, etc.) is nearly, if not entirely, eliminated, as are the safety hazards associated with the disposal of impurity sulfides. The process also facilitates the recovery of Mn, Ni, Co, and other valuable metals, while also producing very little solid waste material.

Figure 3:
FIG. 3 depicts a schematic illustration of one embodiment of a process for producing a purified manganese sulfate solution.

FIG. 3 depicts a schematic representation of an alternative embodiment that provides a process for producing a purified manganese sulfate solution according to the present disclosure. In this embodiment, the stream identified as the "cell feed" in FIGS. 1 and 2 ("purified leach solution" in FIG. 3) is instead combined with a sulfide solution in order to cause the precipitation of high purity MnS. First and second sulfide recovery loops are provided in the embodiment of FIG. 3, with a first sulfide recovery loop (230/232) used to recycle sulfide to the purification step (214), and a second sulfide recovery loop (330/332) used to recycle sulfide used to cause the precipitation of high purity MnS. It will be understood that one or both of the sulfide recovery loops in FIG. 3 can be replaced by the sulfide recovery loop of FIG. 2, wherein sulfide is recovered and recycled as high purity MnS (as a solid or slurry) rather than a sulfide solution. Alternatively, one or both of the sulfide recovery loops in FIG. 3 can be replaced by the sulfide recovery loop of FIG. 4, wherein sulfide is recovered as ammonium sulfide(s) in a two-step process.

Like the previously described embodiments, in leaching step (210), a source of manganese such as reduced manganese ore, primarily comprising MnO, is leached with a sulfuric acid solution (not shown in FIG. 3) in order to convert the MnO (or other manganese source) to manganese (II) sulfate ($MnSO_4$). If necessary, iron, aluminum and/or silica are removed from the leach solution by increasing the pH of the leach solution and adding an oxidizing agent (e.g., $NH_3$, lime and/or MnO) is added to the leach solution in order to increase the pH). Suitable oxidizing agents include, for example, $MnO_2$, oxygen (typically as air), $O_3$ or $H_2O_2$. Following the pH adjustment and the addition of $MnO_2$ and/or air as oxidizing agents, iron, aluminum and silica will precipitate from the leach solution and are removed by filtration in step (212) (or by other conventional means for removing solids).

The leach solution is then subjected to a purification step (214) in order to remove heavy metal impurities, i.e., the Secondary Metals. As before, one or more sulfides are added to the leach solution, causing the heavy metals to be converted into their respective insoluble sulfides. In particular, an aqueous sulfide solution comprising one or more alkali metal, alkaline earth metal and/or ammonium sulfides (as $(NH_4)HS$ and/or $(NH_4)_2S$) is added to the leach solution, wherein the sulfides are obtained from the first sulfide recovery loop (230/232). Following the addition of the sulfide solution, the heavy metal impurities are converted from their sulfates into their respective insoluble sulfides (e.g., NiS, CoS, etc.). A portion of the $MnSO_4$ is also converted into insoluble MnS. The resulting sulfide precipitates are removed from the leach solution by filtration step (216) (or by other conventional means for removing solids), resulting in mixed sulfide solids ("$MS_x$") comprising sulfides of Mn, as well as sulfides of some or all of the Secondary Metals.

Following removal of the mixed sulfide solids (e.g., as a slurry), the purified leach solution is subjected to a manganese precipitation step (314) followed by a second filtration step (316). In the Mn precipitation step (314), an aqueous sulfide solution comprising one or more alkali metal, alkaline earth metal and/or ammonium sulfides (as $(NH_4)HS$ and/or $(NH_4)_2S$) is added to the purified leach solution, wherein the sulfides are obtained from the second sulfide recovery loop (330/332). Following the addition of the sulfide solution, the $MnSO_4$ in the purified leach solution is converted into insoluble, high purity MnS. The resulting high purity MnS precipitate (>90%, >95%, >99%, >99.5%, >99.9%, >99.95%, >99.99%, or even >99.995% purity) is removed from the purified leach solution by a second filtration step (316) (or by other conventional means for removing solids). The waste sulfate solution removed in filtration step (316) is discarded or further processed to recover components thereof, as desired.

The high purity MnS is then reacted with acid (e.g., $H_2SO_4$) in the $H_2S$ generation stage (330) of the second sulfide recovery loop, thereby generating a high purity manganese sulfate solution along with $H_2S$ in the same manner as described above for $H_2S$ generation stage (30) (as well as $H_2S$ generation stage (230) in the embodiment of FIG. 3).

In particular, the embodiment of FIG. 3 includes two sulfide recovery loops, each of which comprises an $H_2S$ generation stage (230, 330) and a sulfide recycle stage (232, 332). In the $H_2S$ generation stage (230), the mixed sulfide solids ($MS_x$) slurry recovered from the leach solution is reacted with an acid, e.g., an aqueous solution of $H_2SO_4$, in order to generate $H_2S$ and $M(SO_4)_x$ (wherein M is Mn as well as some or all of the Secondary Metals (i.e., Ni, Co, Cu, etc.)). In the $H_2S$ generation stage (330), the high purity MnS slurry recovered from the purified leach solution is likewise reacted with an acid, e.g., $H_2SO_4$, in order to generate $H_2S$ and the high purity manganese sulfate solution. In both $H_2S$ generation stages (230, 330) the generated $H_2S$ is then stripped from the reaction solution using, for example, a packed column and air or other gas suitable for stripping $H_2S$. Alternatively, the reaction vessel can be heated to boiling, with the steam carrying the $H_2S$ from the reaction vessel. Of course, a variety of apparatus can be employed for the $H_2S$ generation and removal, such as those commonly used for contacting a gas and a liquid. In addition, various other acids besides $H_2SO_4$ can be used, including HCl and $H_3PO_4$. In addition to stripping $H_2S$ from the reaction solution, the air, steam or other gas used in the $H_2S$ generation stage (230, 330) facilitates the transfer of $H_2S$ from generation stage (230, 330) to the sulfide recycle stage (232, 332).

The solution remaining in the $H_2S$ generation stage (230) comprises a solution of mixed metal sulfates ($M(SO_4)_x$) and can be further processed in the manner described above with respect to the embodiment of FIG. 1.

As before, in the sulfide recycle stages (232, 332), the $H_2S$ from generation stage (230, 330) is absorbed in (i.e., reacted with) a solution, suspension or slurry of one or more alkali metal, alkaline earth metal and/or ammonium hydroxides. Alternatively, the $H_2S$ can be reacted with ammonia gas in order to generate $NH_4HS$. As a further alternative, an alkali metal or alkaline earth metal hydroxide is reacted with H2S to generate the corresponding sulfide(s). For example,

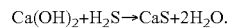
$$Ca(OH)_2 + H_2S \rightarrow CaS + 2H_2O.$$

The resulting sulfide solution is then converted into a different sulfide that is then recycled to the purification step. For example, when CaS is formed in a first step of the sulfide recycle stage (232, 332), in a second step the CaS solution is reacted with an ammonium sulfate ($(NH_4)_2SO_4$) solution to form ammonium sulfide ($(NH_4)HS$ and/or $(NH_4)_2S$). This second step can be performed in any suitable vessel, such as an agitated tank (e.g., a vessel separate from that used for generating the first sulfide from $H_2S$).

The resulting sulfide solution (e.g., $Na_2S/NaHS$, BaS, $(NH_4)HS$ and/or other sulfides) is then returned to purification step (214) or Mn precipitation step (314) described above in order to convert heavy metals in the leach solution and $MnSO_4$ in the purified leach solution into their respective insoluble sulfides (which are thereafter removed from the leach solution or purified leach solution, as described above). Once again it will be understood that any alkali metal, alkaline earth metal and/or ammonium hydroxide can be used in sulfide recycle stages (232, 332), including one or more of LiOH, NaOH, KOH, $Mg(OH)_2$, $Ca(OH)_2$, $Ba(OH)_2$ and/or $NH_4OH$. Similarly, in the embodiment wherein a first sulfide is converted into a second sulfide (e.g., $(NH_4)HS$), this conversion is advantageous in that it allows sulfide to be recycled as ammonium sulfide without requiring the use of ammonia gas (e.g., at sites where ammonia cannot be obtained or utilized).

While FIG. 3 depicts the sulfide solution from the first sulfide recovery loop (230/232) being recycled to the purification step (214) and the sulfide solution from the second sulfide recovery loop (330/332) being recycled to the Mn precipitation step (314), it will be understood that in some embodiments this may be reversed. Alternatively, some of the sulfide solution from either or both of the first and second sulfide recovery loops can be recycled to both the purification step (214) and the Mn precipitation step (314).

As a result of the above process, a highly purified manganese sulfate solution is produced, wherein the solution contains less than 10%, less than 5%, less than 1%, less than 0.5%, less than 0.1%, less than 0.05%, less than 0.01%, or even less than 0.005% by weight of other metals.

While various embodiments have been described in detail above, it will be understood that the processes, components, features and configurations described herein are not limited to the specific embodiments described above. For example, the processes described herein can be used in the production of EMD. In the case of EMD production, spent electrolyte solution is used in the leaching step. In addition, when the process of FIG. 2 is used in conjunction with EMD production, the most convenient source of $Mn^{2+}$ in the sulfide recycle stage (132) is either cell feed or electrolyte solution withdrawn from the electrolysis cell(s).

What is claimed is:

1. A method of producing manganese metal or EMD, comprising:
   (a) leaching a source of manganese with a solution comprising sulfuric acid to form a leach solution;
   (b) adding the one or more sulfides produced in step (g) to said leach solution to form sulfide precipitates comprising one or more heavy metal sulfides;
   (c) removing said sulfide precipitates from said leach solution so as to provide a purified leach solution;
   (d) feeding said purified leach solution to one or more electrolytic cells;
   (e) subjecting the purified leach solution to electrolysis so as to deposit manganese metal or EMD;
   (f) reacting said sulfide precipitates with an acid to generate $H_2S$;
   (g) producing one or more sulfides from said $H_2S$; and
   (h) recycling said one or more sulfides produced in step (g) to step (b).

2. The method of claim 1, wherein producing said one or more sulfides from said $H_2S$ comprises reacting said $H_2S$ with a hydroxide solution or an $Mn^{2+}$ solution.

3. The method of claim 2, wherein the step of reacting said $H_2S$ with a hydroxide solution or an $Mn^{2+}$ solution forms at least one first sulfide, and wherein producing said one or more sulfides from said $H_2S$ further comprises the step of generating said one or more sulfides from said at least one first sulfide.

4. The method of claim 3, wherein said step of generating said one or more sulfides from said at least one first sulfide comprises reacting said at least one first sulfide with ammonium sulfate to generate $(NH_4)HS$ that is recycled back to step (b).

5. The method of claim 4, wherein in step (g) the $H_2S$ is reacted with a solution comprising $Ca(OH)_2$ and said at least one first sulfide comprises CaS.

6. The method of claim 1, wherein said sulfuric acid solution in step (a) comprises electrolyte solution removed from said one or more electrolytic cells.

7. The method of claim 2, wherein the method comprises the production of manganese metal and said electrolyte solution comprises anolyte removed from said one or more electrolytic cells.

8. The method of claim 1, wherein said one or more heavy metal sulfides comprise one or more sulfides of Ni, Co, Cu, Zn, Pb, Mo, Sb, As and Bi.

9. The method of claim 1, wherein in step (f) the sulfide precipitates are reacted with $H_2SO_4$.

10. The method of claim 2, wherein in step (g) the $H_2S$ is reacted with an $Mn^{2+}$ solution in order to produce MnS.

11. The method of claim 2, wherein in step (g) the $H_2S$ is reacted with a solution comprising one or more hydroxides chosen from the group consisting of alkali hydroxide, alkaline earth hydroxide and ammonium hydroxide, and the sulfide precipitates formed in step (b) further comprise MnS.

12. The method of claim 1, wherein said one or more sulfides recycled in step (g) comprises $(NH_4)HS$.

13. The method of claim 1, wherein in step (f) the sulfide precipitates are reacted with acid in an aqueous reaction solution, and further comprising the step of stripping said $H_2S$ from the aqueous reaction solution with air or steam.

14. The method of claim 2, wherein reacting said $H_2S$ with a hydroxide solution or an $Mn^{2+}$ solution comprises absorbing the $H_2S$ in said hydroxide solution or said $Mn^{2+}$ solution.

15. The method of claim 2, wherein step (g) comprises contacting the $H_2S$ gas and said hydroxide or $Mn^{2+}$ solution in a tray column or a packed column.

16. The method of claim 2, wherein step (g) comprises bubbling the $H_2S$ gas into an agitated tank containing said hydroxide or $Mn^{2+}$ solution.

17. A method of producing manganese metal:
   (a) leaching a source of manganese with a solution comprising sulfuric acid to form a leach solution;
   (b) adding metal sulfite solids generated in step (g) to said leach solution to form sulfide precipitates comprising one or more metal sulfides chosen from the group consisting of sulfides of Ni, Co, Cu, Zn, Pb, Mo, Sb, As and Bi;
   (c) removing said sulfide precipitates from said leach solution so as to provide a purified leach solution;
   (d) feeding said purified leach solution to one or more electrolytic cells;
   (e) subjecting the purified leach solution to electrolysis so as to deposit manganese metal on one or more cathodes of said one or more electrolytic cells;
   (f) reacting said sulfide precipitates removed from the leach solution in step (c) with an acid to generate $H_2S$;
   (g) reacting said $H_2S$ generated in step (f) with an $Mn^{2+}$ solution comprising at least one of: (a) a portion of said purified leach solution; and (b) catholyte withdrawn from said one or more electrolytic cells in order to produce metal sulfide solids comprising greater than 90% by weight MnS based on the total metal sulfide solids; and
   (h) recycling the metal sulfide solids produced in step (g) to step (b).

18. The method of claim 17, wherein the sulfide added to the mixed metal sulfate solution is chosen from the group consisting of MnS, $Na_2S$ and NaHS.

19. The method of claim 17, wherein the metal sulfide solids produced in step (g) comprises greater than 99.9% by weight MnS based on the total sulfide solids.

20. A method of producing a purified manganese sulfate solution, comprising:
   (a) leaching a source of manganese with a solution comprising sulfuric acid to form a leach solution;
   (b) adding the one or more sulfides produced in steps (g) and/or (j) to said leach solution to form sulfide precipitates comprising one or more heavy metal sulfides;
   (c) removing said sulfide precipitates from said leach solution so as to provide a purified leach solution;
   (d) adding the one or more sulfides produced in steps (g) and/or (j) to said purified leach solution to form MnS;
   (e) removing said MnS from said purified leach solution;
   (f) reacting said MnS sulfide precipitates removed in step (c) with an acid to generate $H_2S$;
   (g) producing one or more sulfides from the $H_2S$ generated in step (f);
   (h) recycling said one or more sulfides produced in step (g) to step (b) and/or (d);

(i) reacting said MnS removed in step (e) with an acid to generate $H_2S$;
(j) producing one or more sulfides from the $H_2S$ generated in step (i); and
(k) recycling said one or more sulfides produced in step (j) to step (b) and/or (d).

\* \* \* \* \*